United States Patent [19]

Nearhood

[11] 4,151,792
[45] May 1, 1979

[54] COOKER-MIXER APPARATUS

[76] Inventor: Thomas C. Nearhood, 2332 S. Waco, Wichita, Kans. 67213

[21] Appl. No.: 862,484

[22] Filed: Dec. 20, 1977

[51] Int. Cl.² .......................... A47J 27/00; B01F 7/18
[52] U.S. Cl. .................................... 99/348; 366/251; 366/312
[58] Field of Search .................. 99/348; 366/143, 245, 366/247, 249, 251, 254, 281, 312, 313, 309

[56] References Cited

U.S. PATENT DOCUMENTS

| | | | |
|---|---|---|---|
| 2,027,297 | 1/1936 | Tramposch | 366/254 |
| 2,793,166 | 5/1957 | Hatch | 366/143 |
| 3,041,052 | 6/1962 | Deddes | 366/247 |
| 3,357,685 | 12/1967 | Stephens | 99/348 |
| 3,783,770 | 1/1974 | Aries | 99/348 |

*Primary Examiner*—Robert W. Jenkins
*Attorney, Agent, or Firm*—Phillip A. Rein

[57] ABSTRACT

This invention is a cooker - mixer apparatus utilized with a stove type heater element to cook and mix food products simultaneously. More particularly, the cooker - mixer apparatus includes a cooker means having an electrically driven mixer means connected thereto. The cooker means can resemble a conventional pressure cooker structure with a lid assembly releasably connected to a main container member. The mixer means includes a power assembly operable to drive a mixer assembly through a connector shaft assembly. The mixer assembly lies against a bottom wall and lower sidewall area of the main container member and includes a main hub member with four (4) equally spaced paddle assemblies connected thereto. Each paddle assembly includes a spoke member integral on an outer end with a flexible wiper end member. The spoke member is provided with cut-out, material flow channels to aid in mixing of the food product therein. The wiper end member is flexible so as to wipe the sidewall and bottom wall during rotation of the mixer assembly by the power assembly.

3 Claims, 4 Drawing Figures

COOKER-MIXER APPARATUS

PRIOR ART

Numerous types of mixer structures are known to the prior art but they are not adapted to be a combination cooker and mixing apparatus. Also, none of the prior art structures include a mixer assembly as set forth herein.

PREFERRED EMBODIMENT OF THE INVENTION

In one preferred embodiment of this invention, a cooker - mixer apparatus is provided to be utilized on a heater element of a stove or such to heat and mix food products therein. More particularly, the cooker - mixer apparatus includes a cooker means having a mixer means connected thereto. The cooker means includes a container assembly having a cover or lid assembly mounted thereon and, together, resembles a pressure cooker structure. The container assembly includes a main container member with a bottom wall integral with an upright cylindrical sidewall. The lid assembly is secured to the main container member by anchor lugs and a latch assembly to prevent relative movement therebetween on use of the mixer means. The mixer means includes a power assembly secured to a mixer assembly through a connector shaft assembly. The power assembly includes a variable speed motor member operable to drive at selected speeds an output shaft. The output shaft is connected to a drive shaft of the connector shaft assembly which, in turn, is connected to the mixer assembly. The mixer assembly includes a main hub member connected to the drive shaft and having a plurality, namely four, paddle assemblies connected thereto. Each paddle assembly includes an arcuate spoke member integral on an outer end with a wiper member. The spoke member extends in a vertical plane with a central body having spaced material flow channels therein to aid in mixing of the food product held in the main container member and adjacent the bottom wall. The wiper end member is of a resilient material operable to contact and wipe the adjacent portions of the bottom wall and the sidewall during the controlled revolution of the mixer assembly by the power assembly.

OBJECTS OF THE INVENTION

One object of the invention is to provide a cooker - mixer apparatus that functions as both a cooker structure and a mixer structure simultaneously.

Another object of this invention is to provide a cooker - mixer apparatus having a pressure cooker type cooker means with a variable speed mixer means therein to achieve a plurality of selected cooking/mixing conditions.

One other object of this invention is to provide a cooker - mixer apparatus including a new and novel mixer means having a plurality of paddle assemblies to efficiently mix food products contained therein.

Still, one other object of this invention is to provide a cooker - mixer apparatus that is durable in construction, easy to cleanse and use, efficient in operation, provides numerous mixing and cooking combinations, and economical to manufacture.

Various other objects, advantages and features of the invention will become apparent to those skilled in the art from the following discussion, taken in conjunction with the accompanying drawings, in which:

DRAWINGS OF THE INVENTION

Figure 1:
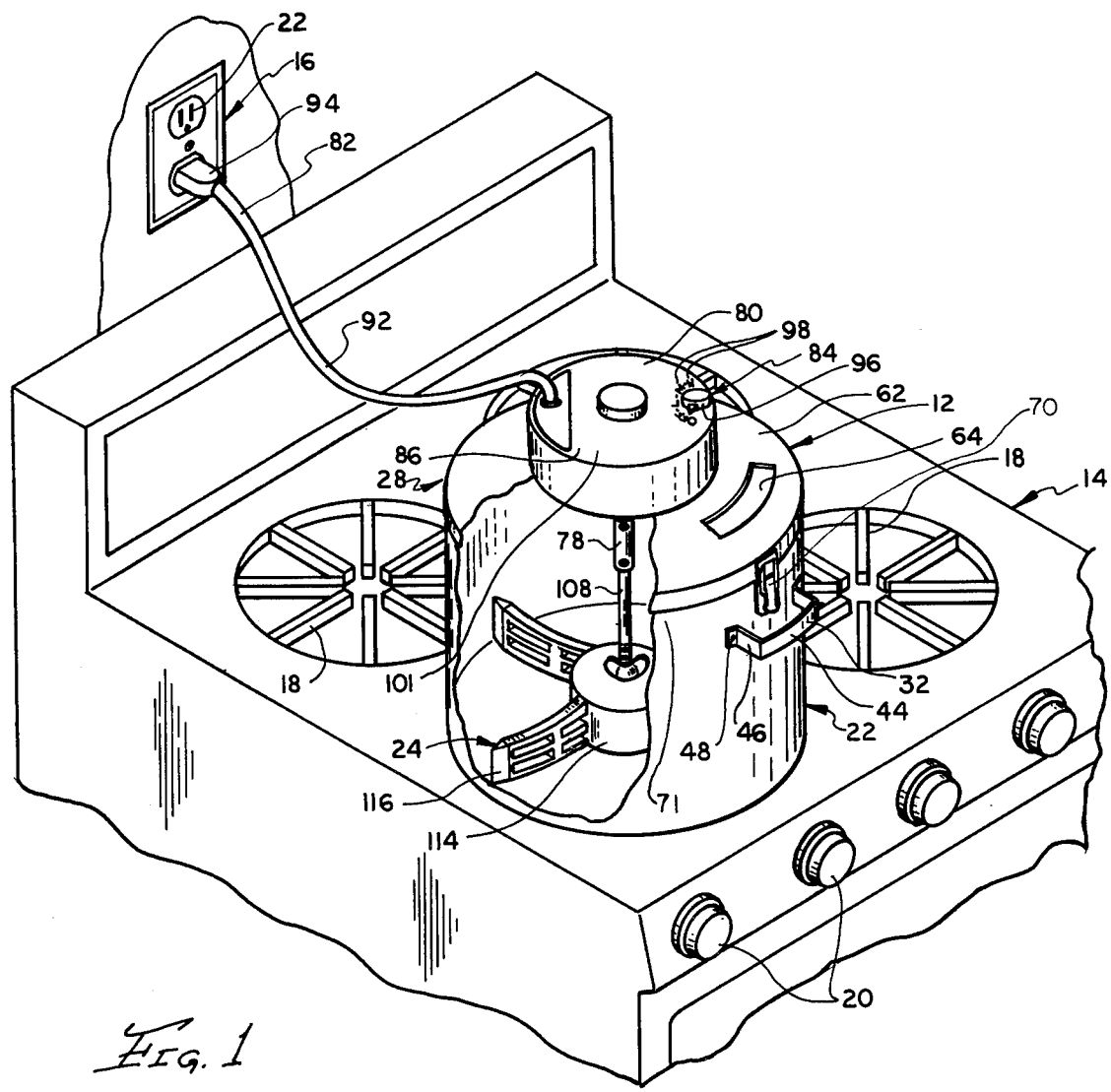
FIG. 1 is a fragmentary perspective view of a cooking stove assembly having a cooker - mixer apparatus of this invention mounted thereon.

The following is a discussion and description of preferred specific embodiments of the new cooker - mixer apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a cooker - mixer apparatus of this invention, indicated generally at 12, is shown as mounted on a cooking stove assembly 14 and operably connected to a power supply outlet 16. The cooking stove assembly 14 includes a plurality of gas burners 18, each associated and controlled by a control knob member 20. Although a cooking stove assembly 14 with gas burners 18 is illustrated, it is obvious that any type of heating structure (electric, propane, open fire, etc.) could be used to heat the cooker - mixer apparatus 12 and any food products contained therein.

The power supply outlet 16 is of a conventional nature supplied with 110 volt AC current to an outlet receptacle 22 as is well known.

The cooker - mixer apparatus 12 includes a cooker means 22 having a mixer means 24 mounted thereon. The cooker means 22 resembles a conventional pressure cooker type structure and includes a container assembly 26 having a cover lid assembly 28 mounted thereon.

Figure 3:
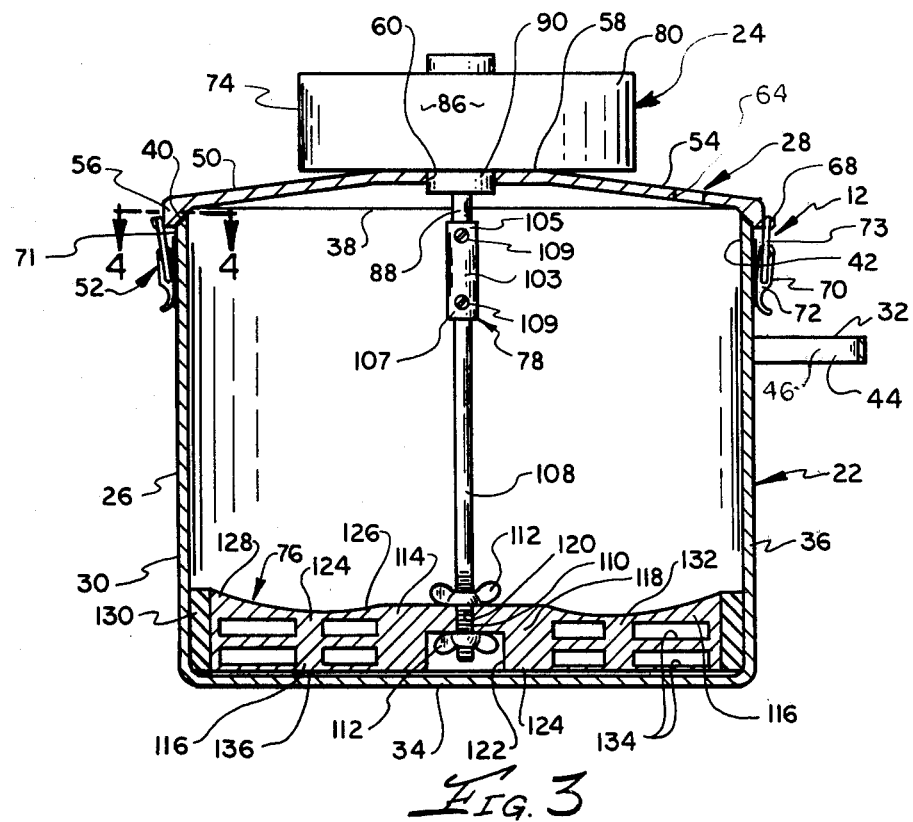
FIG. 3 is an enlarged sectional view of the cooker - mixer apparatus of this invention.
Figure 4:
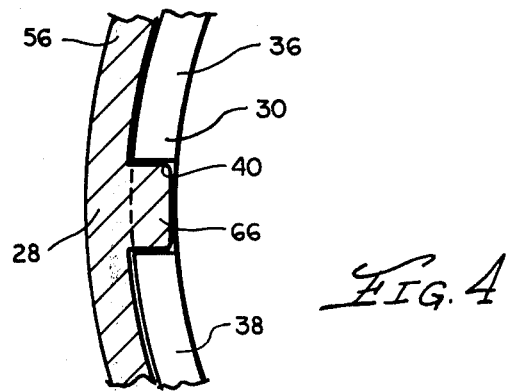
FIG. 4 is an enlarged, fragmentary sectional view taken along line 4—4 in FIG. 3.

As seen in FIG. 3, the container assembly 26 includes a main container member 30 having a handle member 32 connected thereto. The container member 30 resembles a standard cooking pot having a bottom wall 34 integral with a vertical sidewall 36. A top surface 38 of the sidewall 36 is formed with a plurality of spaced notches 40 for reasons to be explained. The container member 30 has a large entrance opening 42 to be selectively closed by the cover lid assembly 28.

The handle member 32 includes a U-shaped main body 44 integral with connector legs 46 which are secured by rivets 48 to the sidewall 36 of the container member 30 (FIG. 1).

The cover lid assembly 28 includes a lid member 50 having a latch assembly 52 connected thereto. The lid member 50 includes a top main lid body 54 having a downwardly depending connector rim 56 about its periphery. The main lid body 54 has a central flat section 58 with a central hole 60 therein to receive a portion of the mixer means 24 as will be explained. Also, a top surface 62 of the lid body 54 is provided with a curved observation window 64 to allow visual surveillance over any food product within the main container member 30.

The connector rim 56 is provided with inwardly projecting anchor lugs 66, each one operably associated with one of the spaced notches 40 on the container member 30 in the interconnected condition. This will prevent relative rotational movement between the container member 30 and the cover lid assembly 28.

Also, the connector rim 56 is provided with diametrically opposed latch projections 68 for connection to the latch assembly 52.

As shown in FIGS. 1 and 3, the latch assembly 52 includes a pair of opposed connector latch assemblies 70 secured to upper outer areas 71 of the main container member 30. Each connector latch member 70 includes a cam actuator 72 connected to an anchor ring 73 which is releasably connectable to respective ones of the latch projections 68. The latch assemblies 52 are of a conventional type and further discussion thereof is not deemed necessary.

The mixer means 24 includes a power assembly 74 connected to a mixer assembly 76 by a connector shaft assembly 78. The power assembly 74 includes a drive motor member 80, a power cord member 82 to connect the drive motor member 80 to the output receptacle 22, and a control assembly 84 mounted on the drive motor member 80.

The drive motor member 80 includes a variable speed motor member 86 operable to drive an output shaft 88 and mounted securely against the flat section 58 of the main lid body 54. A drive hub 90 fits in the central hold 60 of the main lid body 54 (FIG. 3).

The power cord member 82 has an electrical cord 92 with an outer end connected to a plug member 94. As seen in FIG. 1, the plug member 94 is placed in the electrical receptacle 22 to provide electrical current to the motor member 80.

The control assembly 84 includes a control knob 96 operably connected to the variable speed motor member 86 and associated with speed indicia 98 on a top surface portion 101 of the motor member 80. The speed indicia 98 indicates speed from "OFF - LOW - MEDIUM - HIGH" which can be selected by the operator as desired.

As shown in FIG. 3, the connector shaft assembly 78 includes a connector coupling 103 having an upper end section 105 secured to the output shaft 88 and a lower end section 107 secured to a drive shaft 108. The connector coupling 103 has a hole therethrough and connection to the subject shafts are by set screw members 109.

A lower end of the drive shaft 108 is formed with a threaded section 110 to hold a pair of spaced wing nuts 112 therein to clamp the mixer assembly 76 therebetween (FIG. 3).

The mixer assembly 76 includes a main hub member 114 with a plurality of equally spaced, namely four, paddle assemblies 116 integral therewith. The main hub member 114 includes a central body 118 with a hole 120 to receive the drive shaft 108 therethrough and a circular indentation 122 in a bottom surface 124. The circular indentation 122 receives a lower one of the wing nuts 112 therein to prevent contact thereof with the bottom wall 34 of the container member 30.

Each paddle assembly 116 includes a spoke member 124 with an inner end portion 126 integral with the main hub member 114 and an outer end portion 128 integral with a wiper end member 130. The spoke member 124 is formed with an arcuate central body 132 having a plurality of spaced material flow channels or openings 134 therein. The central body 132 is curved rearwardly of the direction of rotation for easy wiping action. Also, the central body 132 has a lower surface 136 adjacent the bottom wall 34 of the container member 30 and extended upwardly therefrom for a combination mixing and wiping action.

Each wiper end member 130 is formed with a connector section 138 integral with a pointed end section 140. The narrowing of the end section 140 in combination with the wiper end member 130 being constructed of resilient material, such as rubber, achieves a flexible wiping of the sidewalls 36 of the container member 30 during operation of the cooker - mixer apparatus 12 of this invention.

USE AND OPERATION

In the use and operation of the cooker - mixer apparatus 12 of this invention, the same is shown in FIG. 1 as mounted on a gas burner 18 of the cooking stove assembly 14. The power cord member 82 is shown with the plug member 94 mounted in the outlet receptacle 22 to provide power to the control assembly 84 of the power assembly 74 of the mixer means 24.

Figure 2:
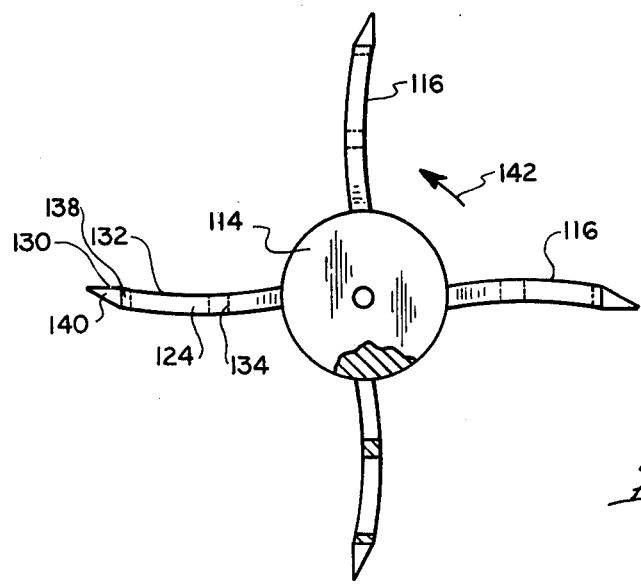
FIG. 2 is a top plan view of a mixer assembly of the cooker - mixer apparatus of this invention having portions broken away for clarity.

A food product to be cooked and mixed is placed within the container assembly 26 with the lid assembly 28 secured thereto as shown in FIG. 1. The control knob 96 can be selectively rotated from "OFF" to "LOW" - "MEDIUM" or "HIGH" to energize the variable speed motor member 86 and drive the mixer assembly 76. Rotation is achieved in the direction shown by an arrow 142 in FIG. 2.

The paddle assemblies 116 operate to thoroughly mix the food product while wiping the bottom wall 34 and sidewall 36 of the container member 30 and prevent over heating and subsequent burning of the food product.

After sufficient cooking and mixing, the latch assemblies 52 are releasable to remove the lid assembly 28 from the container assembly 26. This permits easy removal of the food product in the main container member 30.

It is noted that cooperation of the anchor lugs 66 with the latch notches 40 provides a locking feature to prevent movement between the container assembly 26 and the lid assembly 28. This is especially important as the motor member 80 would create a torque during operation tending to rotate the interconnected lid assembly 28.

It is obvious that the cooker - mixer apparatus of this invention is sturdy in construction, easy to use, and provides a needed combination of cooker and mixer. The cooker means of the cooker - mixer apparatus can be constructed in a sealed manner to operate similar to a pressure cooker.

While the invention has been described in conjunction with preferred specific embodiments thereof, it will be understood that this description is intended to illustrate and not to limit the scope of the invention, which is defined by the following claims.

I claim:

1. A cooker - mixer apparatus operable to receive a food product therein for a cooking and mixing operation, comprising:
   (a) a cooker means having a mixer means connected thereto;
   (b) said cooker means having a container assembly to hold the food product therein and a lid assembly mountable over said container assembly;

(c) said mixer means connected to said lid assembly and having a power assembly connected to a mixer assembly to selectively rotate same;

(d) said mixer assembly having a main hub member and a paddle assembly connected to said hub member;

(e) said paddle assembly to wipe a lower area of said container assembly on rotation thereof for mixing the food product, (f) said mixer assembly having a plurality of spaced paddle assemblies secured to said hub member;

(g) each of said paddle assemblies having a spoke member secured to said hub member and a wiper end member secured to an outer end of said spoke member; and (h) said spoke members each having a plurality of material flow channels adjacent a lower surface therein to permit flow of the food product therethrough on rotation of said mixer assembly to achieve substantial mixing thereof.

2. A cooker - mixer apparatus as described in claim 1, wherein:

(a) said wiper end member of a resilient material having a flexible pointed end portion tapered outwardly to a point from a connector section secured to said spoke member operable to wipe said container assembly on rotation of said mixer means.

3. A cooker - mixer apparatus as described in claim 1, wherein:

(a) said spoke members of arcuate shape; and (b) said wiper end member curved in an arcuate manner similar to said spoke members;

whereby said spoke members operate to wipe a bottom wall of said wiper end members operable to jointly wipe a junction of said bottom wall and said sidewall of said container assembly.

* * * * *